United States Patent
Freeman et al.

(10) Patent No.: US 7,673,161 B2
(45) Date of Patent: Mar. 2, 2010

(54) APPARATUS, SYSTEM, AND METHOD FOR SELECTING A WAKING PROCESS

(75) Inventors: Joseph Wayne Freeman, Raleigh, NC (US); Randall Scott Springfield, Chapel Hill, NC (US); Rod David Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 11/277,730

(22) Filed: Mar. 28, 2006

(65) Prior Publication Data

US 2007/0234092 A1 Oct. 4, 2007

(51) Int. Cl.
*G06F 1/00* (2006.01)
*G06F 9/00* (2006.01)
*G06F 15/177* (2006.01)
*G06F 9/24* (2006.01)
*G06F 1/24* (2006.01)
*G06F 1/26* (2006.01)
*G06F 1/32* (2006.01)
*G06F 15/16* (2006.01)

(52) U.S. Cl. .............. 713/323; 713/1; 713/2; 713/100; 713/300; 713/320; 709/231

(58) Field of Classification Search ............ 713/300, 713/323, 320, 1, 2, 100; 709/231
See application file for complete search history.

(56) References Cited

U.S. PATENT DOCUMENTS

| | | | |
|---|---|---|---|
| 4,497,021 A * | 1/1985 | Fukuda et al. ............. 712/43 |
| 4,694,280 A | 9/1987 | Rollhaus et al. ........... 340/365 |
| 4,937,778 A | 6/1990 | Wolf et al. ............... 364/900 |
| 5,056,057 A | 10/1991 | Johnson et al. .......... 364/900 |
| 5,287,526 A | 2/1994 | Wolf et al. ............... 395/800 |
| 5,333,273 A | 7/1994 | Raasch et al. ............ 395/275 |
| 5,404,321 A | 4/1995 | Mattox ................ 364/709.01 |
| 5,428,790 A * | 6/1995 | Harper et al. ............. 713/322 |
| 5,623,261 A | 4/1997 | Rose ....................... 341/26 |
| 5,633,654 A * | 5/1997 | Kennedy et al. .......... 345/634 |
| 5,872,995 A | 2/1999 | Chaiken ................. 395/825 |
| 5,881,318 A | 3/1999 | Liebenow ............... 395/887 |
| 6,212,632 B1 * | 4/2001 | Surine et al. ............... 713/2 |
| 6,266,714 B1 | 7/2001 | Jacobs et al. .............. 710/14 |
| 6,272,645 B1 * | 8/2001 | Wang ...................... 713/323 |
| 6,279,056 B1 | 8/2001 | Jacobs et al. .............. 710/48 |
| 6,434,696 B1 * | 8/2002 | Kang ........................ 713/2 |
| 6,704,811 B2 | 3/2004 | Jacobs et al. .............. 710/14 |
| 6,710,771 B1 | 3/2004 | Yamaguchi et al. ....... 345/184 |
| 6,724,399 B1 | 4/2004 | Katchour et al. .......... 345/740 |
| 6,947,031 B2 | 9/2005 | Sandbach et al. ......... 345/168 |
| 6,972,699 B2 * | 12/2005 | Olodort et al. ............. 341/22 |
| 6,980,946 B2 * | 12/2005 | Giles et al. ................ 703/22 |

(Continued)

*Primary Examiner*—Ji H Bae
(74) *Attorney, Agent, or Firm*—Kunzler & McKenzle (57) ABSTRACT

An apparatus, system, and method are disclosed for selecting a waking process. An input module receives a specified input during the off state of a data processing device. In addition, the input module stores the input in the storage module. The storage module may be integrated within the input module. The input module activates the data processing device in response to the input. A wake module retrieves the input from the storage module. In addition, the wake module determines a process that corresponds to the input. The wake module wakes the data processing device using the process.

18 Claims, 7 Drawing Sheets

U.S. PATENT DOCUMENTS

| | | | | |
|---|---|---|---|---|
| 7,325,100 B2 * | 1/2008 | Dhiman et al. | | 711/137 |
| 7,401,249 B2 * | 7/2008 | Zhang | | 714/5 |
| 7,424,601 B2 * | 9/2008 | Xu | | 713/1 |
| 2002/0152372 A1 * | 10/2002 | Cole et al. | | 713/2 |
| 2003/0196125 A1 * | 10/2003 | Ferguson | | 713/300 |
| 2003/0222854 A1 | 12/2003 | Yurugi et al. | | 345/172 |
| 2004/0093446 A1 | 5/2004 | Lin | | 710/67 |
| 2004/0103343 A1 * | 5/2004 | Wu et al. | | 714/14 |
| 2006/0038787 A1 * | 2/2006 | Kuo | | 345/168 |
| 2007/0028132 A1 * | 2/2007 | Wang | | 713/323 |
| 2007/0162875 A1 * | 7/2007 | Paquette et al. | | 715/847 |

* cited by examiner

APPARATUS, SYSTEM, AND METHOD FOR SELECTING A WAKING PROCESS

BACKGROUND OF THE INVENTION

1. Field of the Invention

This invention relates to selecting processes and more particularly relates to selecting a waking process for a data processing device.

2. Description of the Related Art

Data processing devices such as computer workstations, laptop computers, personal digital assistants ("PDA"), media players, game players, cellular telephones, and the like typically wake from an off state and/or a standby mode to execute a specified software process. For example, a computer workstation may wake from an off state to execute a binary input/output system ("BIOS") process that initializes a plurality of devices within the workstation and loads a primary operating system.

A user may wish to select one or more alternate waking processes for a data processing device. For example, the user may wish to wake the computer workstation and load an alternate operating system. Similarly, the user may wish to wake a laptop computer with a specified function such as a simplified operating system for displaying a DVD-based moving picture.

Data processing devices have incorporated selection devices such as toggle switches on enclosures and/or special function keys built into customized keyboards that can select waking processes. Unfortunately, when a data processing device employs a standard input device such as an industry standard keyboard, or when the enclosure of the data processing device is inaccessible, it may be impractical to provide a readily accessible selection device.

For example, a selection device disposed on an enclosure may be impractical when the enclosure is not accessible to the user, such as if the enclosure that is kept in a cabinet. Disposing the selection device on a keyboard may also be impractical when the data processing device is configured to use an industry standard keyboard that lacks the needed selection device.

From the foregoing discussion, it should be apparent that a need exists for an apparatus, system, and method that select a waking process. Beneficially, such an apparatus, system, and method would allow a user to wake a data processing device to a specified process such as an alternate operating system, an entertainment process, a recovery process, and/or a diagnostic process.

SUMMARY OF THE INVENTION

The present invention has been developed in response to the present state of the art, and in particular, in response to the problems and needs in the art that have not yet been fully solved by currently available waking process selection methods. Accordingly, the present invention has been developed to provide an apparatus, system, and method for selecting a waking process that overcome many or all of the above-discussed shortcomings in the art.

The apparatus to select a waking process is provided with a plurality of modules configured to functionally execute the steps of receiving a specified input, storing the input, activating a data processing device, retrieving the input, determining a process, and waking the data processing device. These modules in the described embodiments include an input module, a storage module, and a wake module.

The input module is in communication with a data processing device. The data processing device may be a computer, a PDA, a media player, a cellular telephone, a game player, or the like. The input module receives a specified input during a data processing device off state. In one embodiment, the input module is a keyboard. The input may be a specified keystroke to a wake selection key, a specified combination of keystrokes, or the like. Alternatively, the input module may be a touch screen. In a certain embodiment, the input module is a pointing device such as a computer mouse, a track ball, or the like. The input module activates the data processing device in response to the input.

The storage module stores the input. In one embodiment, the storage module is integrated within the input module. In an alternate embodiment, the storage module is integrated within the data processing device. In a certain embodiment, the storage module is configured as non-volatile memory.

The wake module retrieves the input from the storage module. In one embodiment, the wake module is integrated within the data processing device. In a certain embodiment, the wake module comprises a BIOS module.

The wake module determines a process that corresponds to the input. The wake module may select the process from a process table. In one embodiment, the wake module using the input as a key to select the process from the process table. In addition, the wake module wakes the data processing device using the process. The process may be an alternate operating system such as an operating system configured for entertainment functions. Alternatively, the process may be a diagnostic process. In a prophetic example, the process may test the functions of elements of the data processing device. The process may also be a recovery process. In a prophetic example, the process may recover data from a damaged hard disk. The apparatus allows a user to wake the data processing device using one of a plurality of processes selected by the input.

A system of the present invention is also presented to select awaking process. The system may be embodied in a data processing device. In particular, the system, in one embodiment, includes a processor module, a memory module a keyboard, a storage module, and a wake module.

The processor module executes software instructions and processes data. The memory module stores the software instructions and data. The keyboard is in communication with the data processing device and receives a specified input during a data processing device off state. The keyboard activates the data processing device in response to the input.

The storage module stores the input. The wake module retrieves the input from the storage module. In addition, the wake module determines a process that corresponds to the input, and wakes the data processing device using the process. The process may be an alternate operating system. Alternatively, the process may be a recovery process. In a certain embodiment, the process is a diagnostic process. The system supports selecting a waking process from a plurality of waking processes.

A method of the present invention is also presented for selecting a waking process. The method in the disclosed embodiments substantially includes the steps to carry out the functions presented above with respect to the operation of the described apparatus and system. In one embodiment, the method includes receiving a specified input, storing the input, activating a data processing device, retrieving the input, determining a process, and waking the data processing device.

In one embodiment, a storage module stores a plurality of specified input values. An input module receives a specified input during the off state of a data processing device. In addition, the input module stores the input in the storage module. The storage module may be integrated within the input module. The input module activates the data processing device in response to the input. A wake module retrieves the input from the storage module. In addition, the wake module determines a process that corresponds to the input. The wake module wakes the data processing device using the process. The method supports selecting the waking process using the input.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention selects a waking process in response to an input received during a data processing device off state. In addition, the embodiment of the present invention supports waking the data processing device using the selected waking process. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a schematic flow chart diagram illustrating one embodiment of a waking process selection method in accordance with the present invention.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
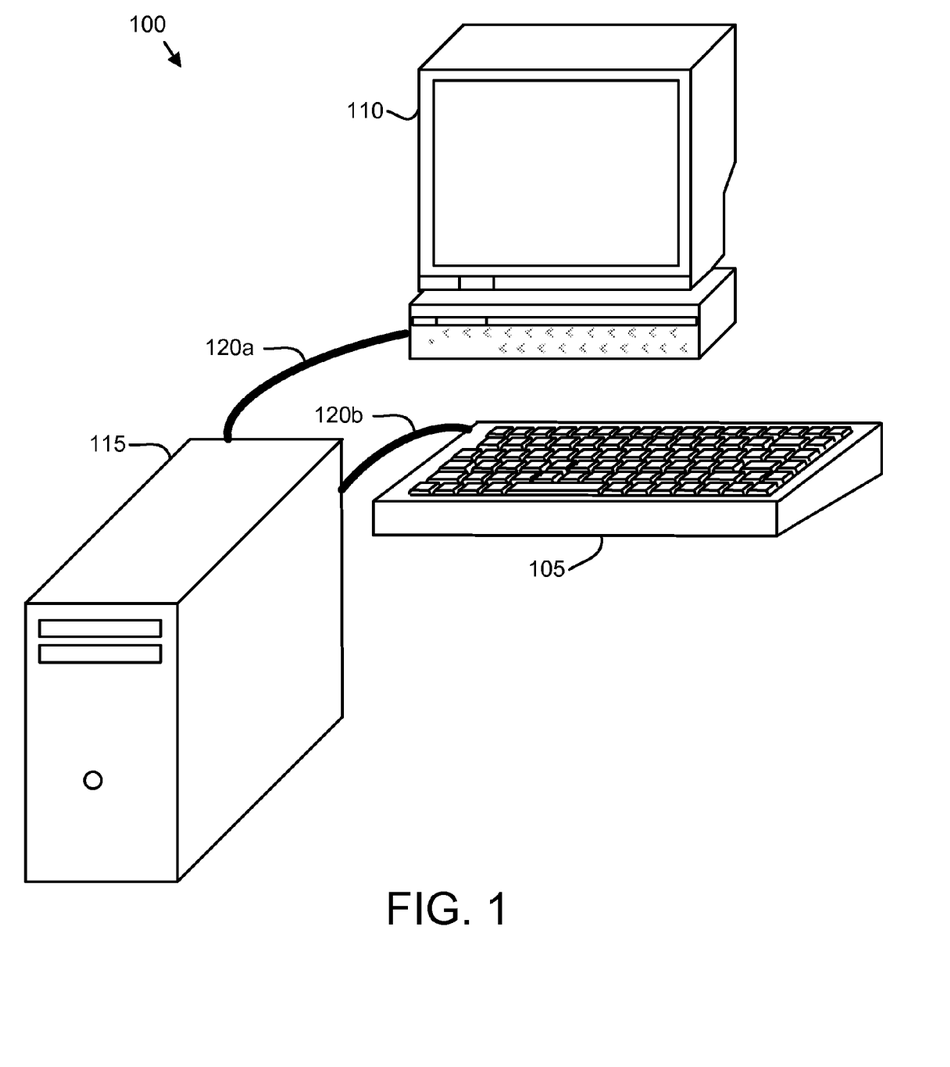
FIG. 1 is a schematic block diagram illustrating one embodiment of a data processing device in accordance with the present invention.

FIG. 1 is a schematic block diagram illustrating one embodiment of a data processing device 100 in accordance with the present invention. As depicted, the data processing device 100 is configured as a computer. However, the data processing device 100 may also be configured as a laptop computer, PDA, media player, game player, and/or cellular telephone as is well known by those skilled in the art. As shown, the data processing device 100 includes a keyboard 105, a display 110, and an enclosure 115.

The enclosure 115 may include one or more circuit cards, power supplies, connectors, hard disk drives, fans, and optical disk drives as is well known to those skilled in the art. One or more circuit cards within the enclosure 115 comprising a processor module and a memory module as will be described hereafter communicates with the keyboard 105 and the display 110 through cables 120.

The data processing device 100 typically wakes from an off state using a specified waking process. For example, the waking process may load and execute a primary operating system. The primary operating system manages the function of the data processing device. For example, the primary operating system may manage receiving inputs from the keyboard 105 and displaying information on the display 110 as is well known to those skilled in the art.

A user may wish to wake the data processing device 100 using an alternate waking process. In a prophetic example, if the data processing device 100 fails to successfully load and execute the primary operating system while waking, the user may wish to wake data processing device 100 using a diagnostic process. The diagnostic process may execute one or more tests that are configured to determine if all elements of the data processing device 100 are functioning and why the data processing device 100 cannot load and execute the primary operating system.

Similarly, the user may wish to wake the data processing device 100 using an alternate operating system. The alternate operating system may be configured to support one or more specialized functions such as entertainment functions. For example, the alternate operating system may support receiving, decompressing, and displaying a highly compressed video stream. The alternate operating system may not support all the functionality of the primary operating system in order to preserve processing bandwidth for functions related to displaying the video stream.

Unfortunately, the user may be unable to access the enclosure 115, making it difficult to select a waking process using an enclosure-mounted switch and/or button. In addition, the keyboard 105 may be an industry standard keyboard that lacks a dedicated key, switch, and/or button that may be used to select the waking process. The embodiment of the present invention selects a waking process as will be described hereafter.

Figure 2:
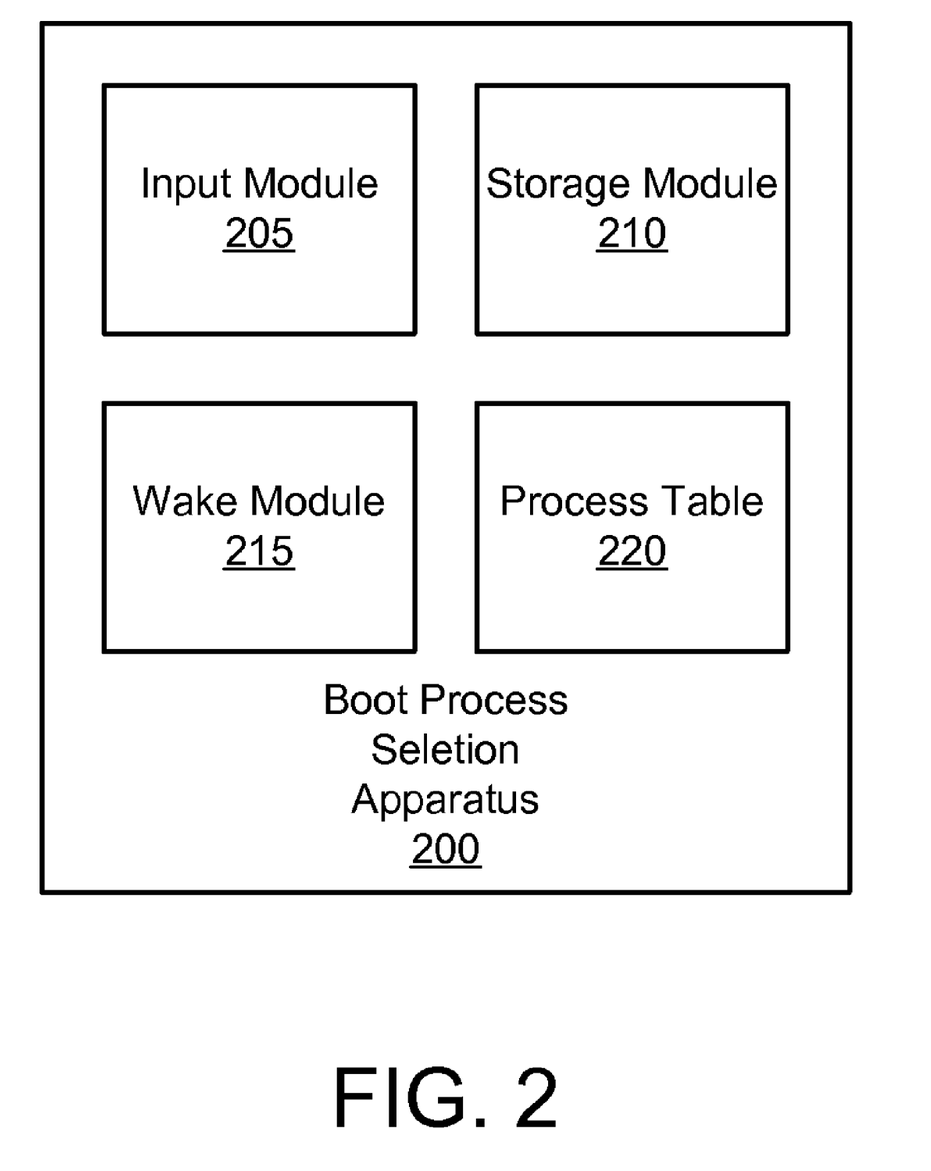
FIG. 2 is a schematic block diagram illustrating one embodiment of a waking process selection apparatus of the present invention.

FIG. 2 is a schematic block diagram illustrating one embodiment of a waking process selection apparatus 200 of the present invention. The apparatus 200 may be embodied in the data processing device 100 of FIG. 1. The description of the apparatus 200 refers to elements of FIG. 1, like numbers referring to like elements. The apparatus 200 includes an input module 205, a storage module 210, and a wake module 215. In one embodiment, the apparatus further includes a process table 220.

The input module 205 is in communication with the data processing device 100. In one embodiment, the input module 205 may be integrated within the data processing device 100. The input module 205 is configured to receive a specified input during a data processing device off state.

In one embodiment, the data processing device 100 does not store a context of an operational state during the off state. In a prophetic example, the data processing device 100 may power down to the off state without saving an instruction pointer value, one or more register values, one or more flag values, one or more memory data values, and the like to non-volatile memory. In an alternate embodiment, the data processing device may save an operational context during the off state. In a prophetic example, the data processing device 100 may write an instruction pointer value, one or more register values, one or more flag values, one or more memory data values, and the like to a hard disk drive to store the operational context.

The input module 205 may be a keyboard 105 such as the keyboard 105 of FIG. 1. In one embodiment, the keyboard 105 conforms to an industry standard for interoperability. For example, the keyboard 105 may include a universal serial bus ("USB") interface and communicate with the enclosure 115 through a USB cable. The keyboard 105 may further be configured to operate with a plurality of data processing devices 100 that support the USB interface.

The input may be a specified keystroke. In a prophetic example, the input may be a keystroke to a wake selection key configured to wake the data processing device 100. Alternatively, the input may be a specified combination of keystrokes. For example, the input may comprise substantially simultaneous keystrokes to the wake selection key and to an 'A' key.

In an alternate embodiment, the input module 205 may be a touch screen. In a prophetic example, the touch screen may display a soft key while the data processing device 100 is in the off state. The soft key may be a displayed icon resembling a key and/or button. The touch screen may detect the user touching the soft key as the input, which is received by the input module 205.

In a certain embodiment, the input module 205 is a pointing device such as a computer mouse, a track ball, or the like. In a prophetic example, a mouse may include two buttons. The user depressing both buttons simultaneously may generate the input, which is received by the input module 205. The input module 205 activates the data processing device 100 in response to the input. In one embodiment, the input module 205 initiates a power on function for the data processing device 100 in response to the input.

The storage module 210 stores the input. The input module 205 may write the input to the storage module 210. In one embodiment, the storage module 210 is integrated within the input module 205. In a prophetic example, the storage module 210 may be a module of Flash random access memory ("RAM") disposed within and in electrical communication with the input device 205. In an alternate embodiment, the storage module 210 is integrated within the data processing device 110. In a prophetic example, the storage module 210 may be configured as one or more non-volatile registers in a USB interface of the data processing device 100 that receive and store data while the data processing device 100 is in the off state.

The wake module 215 retrieves the input from the storage module 210. In one embodiment, the wake module 215 is integrated within the data processing device 100. The data processing device 100 may activate the wake module 215 when the input module 205 activates the data processing device 100. In a certain embodiment, the wake module 215 comprises a BIOS module as will be described hereafter.

The wake module 215 is further configured to determine a process that corresponds to the input, and wake the data processing device 100 using the process as will be described hereafter. In one embodiment, the wake module 215 employs the process table 220 to determine the process. The process table 220 may be configured as a data array that stores input values and addresses for corresponding processes.

Figure 3:
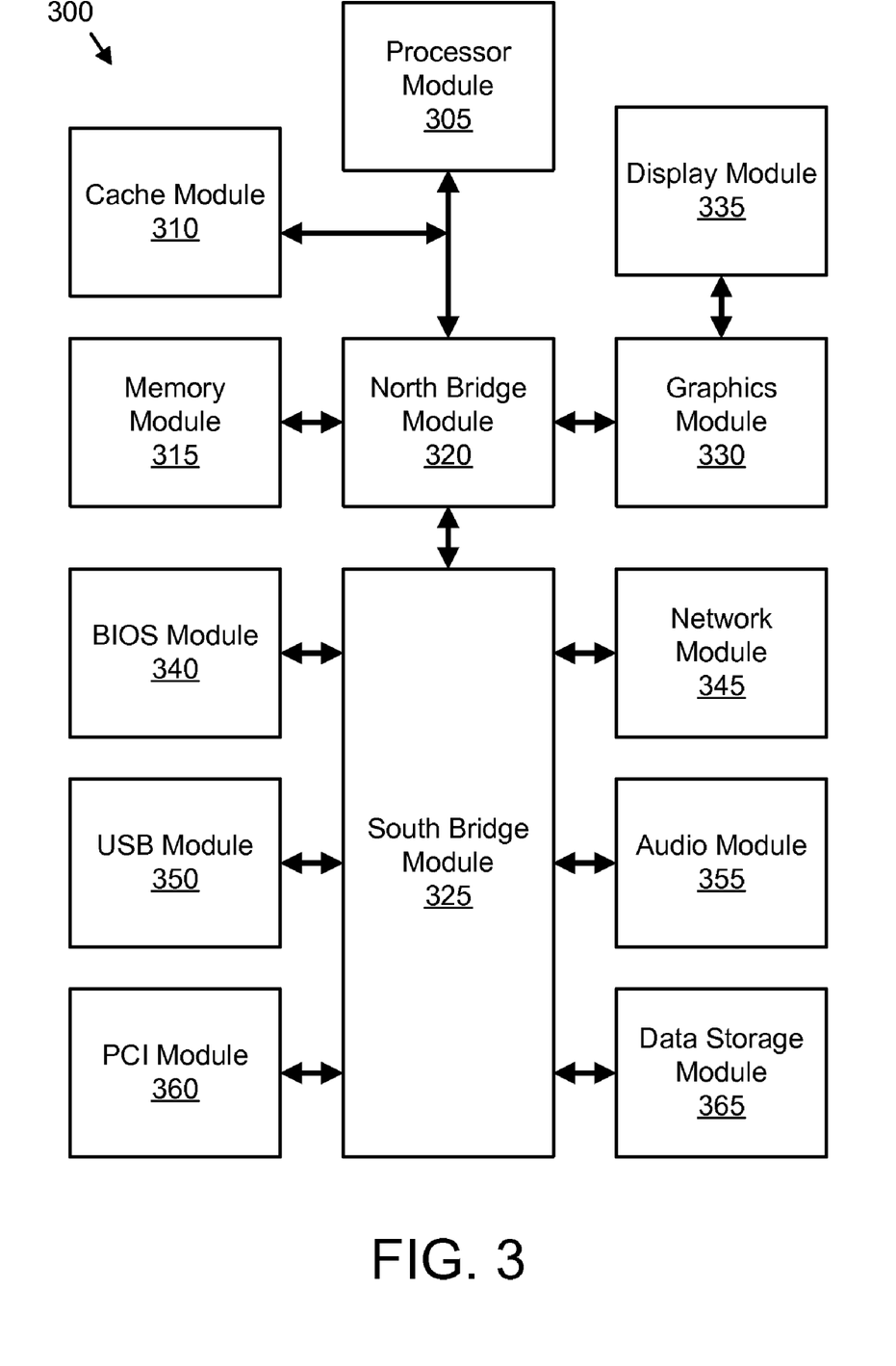
FIG. 3 is a schematic block diagram illustrating one embodiment of a computer of the present invention.

FIG. 3 is a schematic block diagram illustrating one embodiment of a computer 300 of the present invention. The computer 300 is one embodiment of the data processing device 100. The computer 300 includes a processor module 305, a cache module 310, a memory module 315, a north bridge module 320, a south bridge module 325, a graphics module 330, a display module 335, a BIOS module 340, a network module 345, a USB module 350, an audio module 355, a peripheral component interconnect ("PCI") module 360, and a data storage module 365.

The processor module 305, cache module 310, memory module 315, north bridge module 320, south bridge module 325, graphics module 330, display module 335, BIOS module 340, network module 345, USB module 350, audio module 355, PCI module 360, and data storage module 365, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 315 stores software instructions and data. The processor module 305 executes the software instructions and manipulates the data as is well know to those skilled in the art. The cache module 310 may cache data values from the memory module 315. The north bridge module 320 may support communications between the processor module 305 and the memory module 315. In addition, the north bridge module 320 may communicate data to the graphics module 330 for display on the display module 335.

The south bridge module 325 may communicate with the north bridge module 320. In addition, the south bridge module 325 may interface with the BIOS module 340, network module 345, USB module 350, audio module 355, PCI module 360, and data storage module 365. The network module 345 may communicate with a network such as an Ethernet network and may be configured as an Ethernet interface as is well known to those skilled in the art. The USB module 350 may include a USB interface and communicate with one or more USB devices. In one embodiment, the keyboard 105 communicates through the USB module 350.

The audio module 355 may convert digital audio data into an analog audio signal and provide the analog audio signal at a connector such as a stereo connector. The PCI module 360 may support the connection of one or more PCI circuit cards with the computer 300. The data storage module 365 may read data from and write data to a storage device such as a hard disk drive as is well known to those skilled in the art.

The BIOS module 340 may include non-volatile memory such as Flash RAM. The non-volatile memory may store software instructions for initially configuring the computer 300, including configuring communications between the north bridge module 320 and the graphics module 330, and communications between the south bridge module 325 and the network module 345, USB module 350, audio module 355, PCI module 360, and data storage module 365.

In addition, the BIOS module 340 may direct the processor module 305 to retrieve and execute a software process. For example, the BIOS module 340 may direct the processor module 340 to retrieve one or more software processes comprising the primary operating system from a hard disk drive through the data storage module 365, store the primary operating system processes in the memory module 315, and execute the primary operating system software processes.

In one embodiment, the BIOS module 340 may embody the wake module 215 of FIG. 2. The wake module 215 may be configured as software instructions stored in the Flash RAM of the BIOS module 340. In addition, the BIOS module 340 may comprise the process table 220 of FIG. 2, the process table 220 configured as data stored in the Flash RAM.

Figure 4:
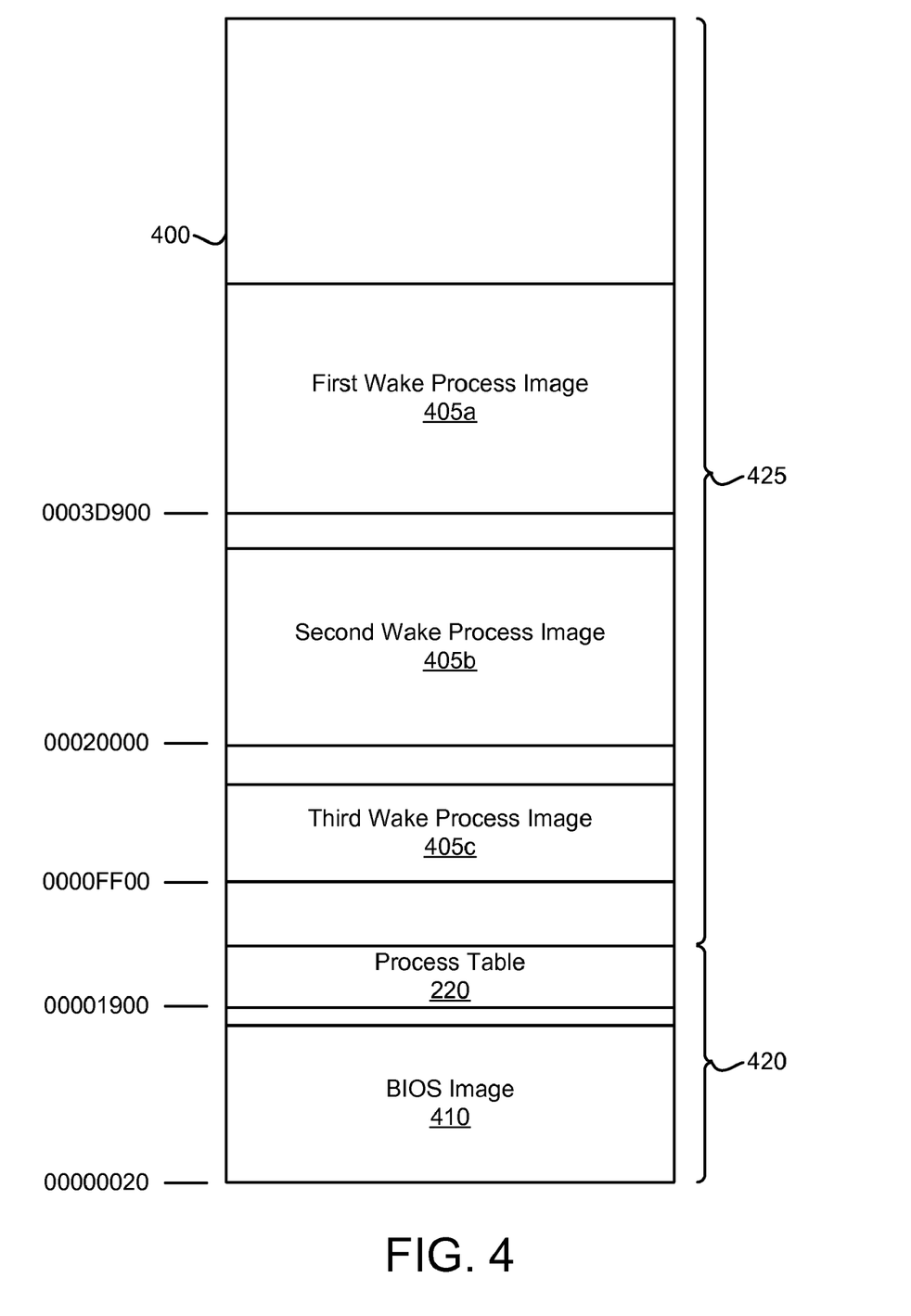
FIG. 4 is a schematic block diagram illustrating one embodiment of a storage map of the present invention.

FIG. 4 is a schematic block diagram illustrating one embodiment of a storage map 400 of the present invention. The description of the storage map 400 refers to elements of FIGS. 1-3, like numbers referring to like elements. The storage map 400 depicts the one or more software process images 405, 410 at storage addresses within a data processing device 100 such as the computer 300 of FIG. 3. For simplicity, the depicted scale of storage locations occupied by the software process images 405, 410 is not proportion to the scale of the storage map 400.

The storage map 400 includes a BIOS image 410. The BIOS image 410 is a software process image and may be stored in a Flash RAM memory space 420 of the BIOS module 340. The Flash RAM memory space 420 may also include the process table 220 as will be described hereafter.

The storage map 400 also includes one or more wake process images 405. Each wake process image 405 is configured as a software process image. The wake process images 405 may be stored on a hard disk drive memory space 425 that is accessed through the data storage module 365.

The wake process images 405, process table 220, and BIOS image 410 each have an address. As depicted, the BIOS image 410 begins at hexadecimal address 'x00000020h,' the process table 220 begins at hexadecimal address 'x00001900h,' the first wake process 405a at hexadecimal address 'x0003D900h,' the second wake process 405b at hexadecimal address 'x00020000h,' and the third wake process 405c at hexadecimal address 'x0000FF00h.'

In one embodiment, each wake process image 405 is configured for a unique function. In a prophetic example, the first wake process image 405a may be the image of a primary operating system. The second wake process image 405b may be the image of an alternate operating system such as an operating system dedicated to entertainment functions. The third wake process image 405c may be the image of a diagnostic process such as a process to test the data processing device 100. In addition, wake process images 405 may include a recovery process that recovers data from a damaged data storage device, an installation process for installing and configuring hardware, and the like.

Figure 5A:
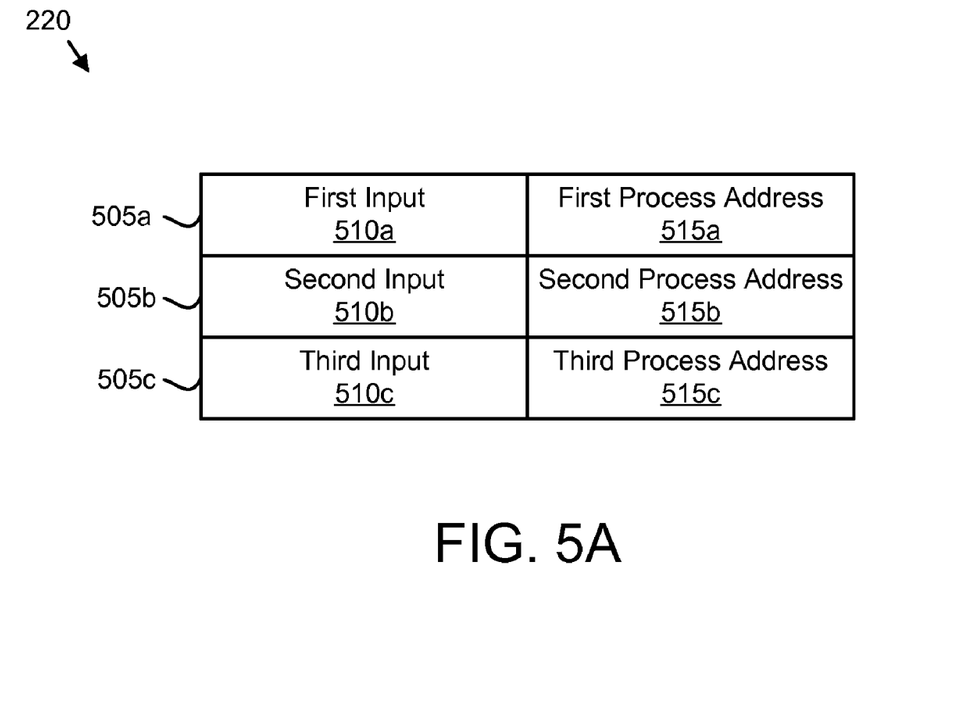
FIG. 5A is a schematic block diagram illustrating one embodiment of a process table of the present invention.

FIG. 5A is a schematic block diagram illustrating one embodiment of a process table 220 of the present invention. The process table 220 is the process table 220 of FIGS. 2 and 4. As shown, the process table 220 includes one or more data arrays 505. The process table 220 may be organized as a flat file with delimited data arrays 505, an array of linked data arrays 505, or the like.

Each data array 505 includes an input value data field 510 and a process address data field 515. The input value data field 510 stores a specified input value. The input value of the input value data field 510 is the input that when received by the input module 205 causes the input module 205 to activate the data processing device 100. The process address data field 515 stores an address value of a wake process image 405 that corresponds to the input of the input value data field 510.

Figure 5B:
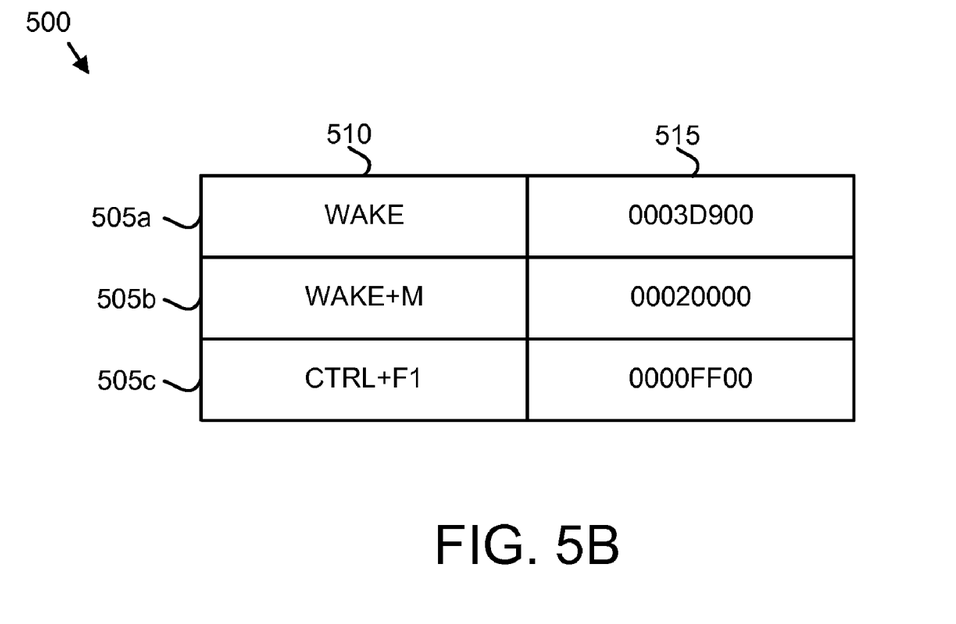
FIG. 5B is a schematic block diagram illustrating one embodiment of a populated process table of the present invention.

FIG. 5B is a schematic block diagram illustrating one embodiment of a populated process table 500 of the present invention. The table 500 shows a prophetic example of the process table 200 of FIG. 5A populated with data values. The description of the table 500 also refers to elements of FIGS. 1-5A, like numbers referring to like elements.

The wake module 215 may employ the table 500 to determine a process that corresponds to an input. The first input value data field 510*a* stores the input value 'WAKE' wherein 'WAKE' represents a digital code that may be generated by the input module 205. In a prophetic example, the input module 205 is configured as the keyboard 105 and depressing a 'WAKE' wake selection key disposed on the keyboard 105 generates the 'WAKE' input.

The first process address data field 515*a* stores the process address 'x003D900h,' which is the hexadecimal address of the first wake process image 405*a* of FIG. 4. The table 500 associates the input value 'WAKE' with the first wake process image 405*a*.

Similarly, the second input value data field 510*b* stores the input value 'WAKE+M.' The input value 'WAKE+M' may represent a digital code generated by the input module 205. In a prophetic example, the 'WAKE+M' digital code may be generated when the 'WAKE' wake selection key and the 'M' key of the keyboard 105 are substantially simultaneously depressed.

The second process address data field 515*b* stores the process address 'x00020000h,' which is the hexadecimal address of the second wake process image 405*b* of FIG. 4. The table 500 associates the input value 'WAKE+M' with the second wake process image 405*b*.

The third input value data field 510*c* stores the input value 'CTRL+F1,' representing a digital code generated by the input module 205. In a prophetic example, the 'CTRL+F1' digital code may be generated when the Control key and the 'F1' key of the keyboard 105 are substantially simultaneously depressed.

The third process address data field 515*c* stores the process address 'x0000FF00h,' which is the hexadecimal address of the third wake process image 405*c* of FIG. 4. The table 500 associates the input value 'CTRL+F1' with the third wake process image 405*c*.

Figure 6:
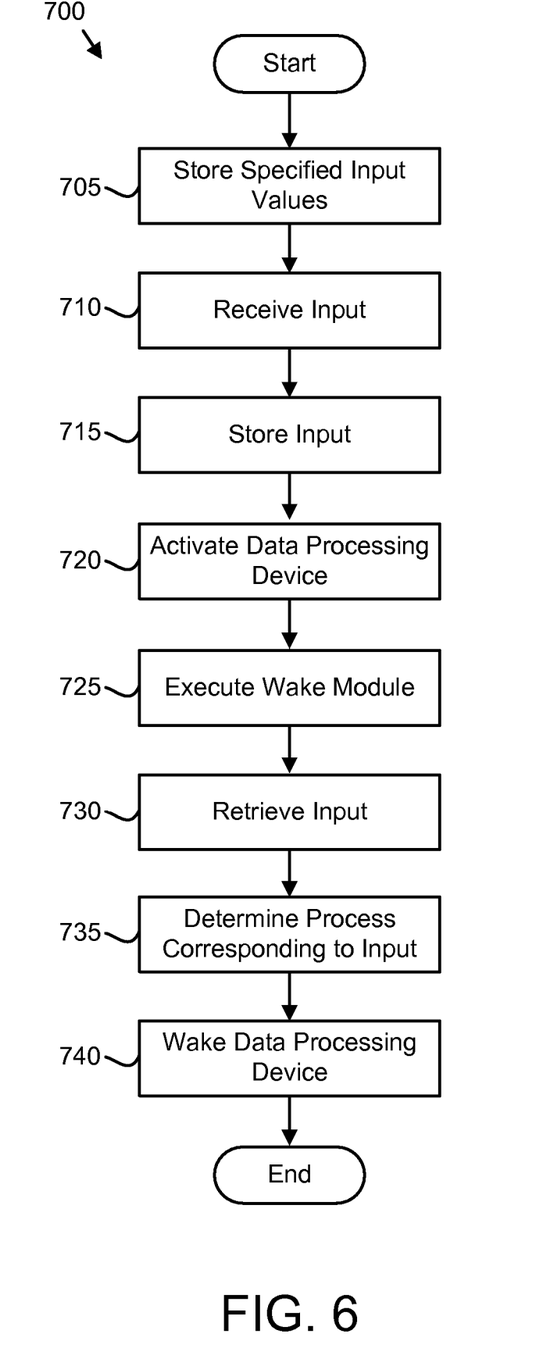
FIG. 6A is a schematic block diagram illustrating one embodiment of a storage module of the present invention.
FIG. 6B is a schematic block diagram illustrating one embodiment of a storage module with stored input of the present invention.
Figure 6A:
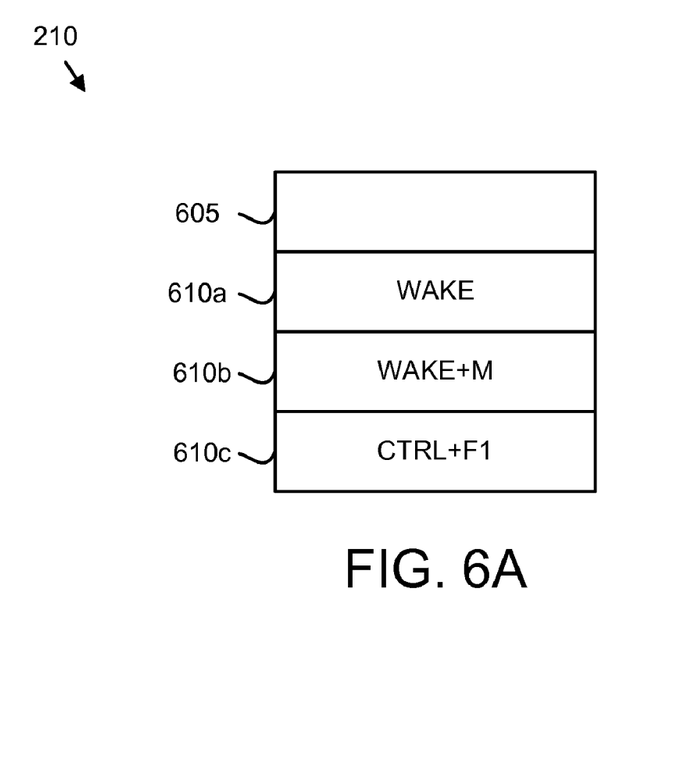

FIG. 6A is a schematic block diagram illustrating one embodiment of a storage module 210 of the present invention. The description of the storage module 210 also refers to elements of FIGS. 1-5B, like numbers referring to like elements. The storage module 210 is populated with the data values of FIG. 5B in a prophetic example. In particular, a plurality of specified input value data fields 610 store the input values of the input value data fields 510 of the process table 220 of FIG. 5B. In one embodiment, the specified input value data fields 610 each store an input value for an input that is configured to wake the data processing device 100.

The storage module 210 also includes an input storage data field 605. The input storage data field 605 stores the user input that wakes the data processing device 100. In one embodiment, the input storage data field 605 latches the most recent user input to the input module 205 while the data processing device 100 is in the off state.

Figure 6B:
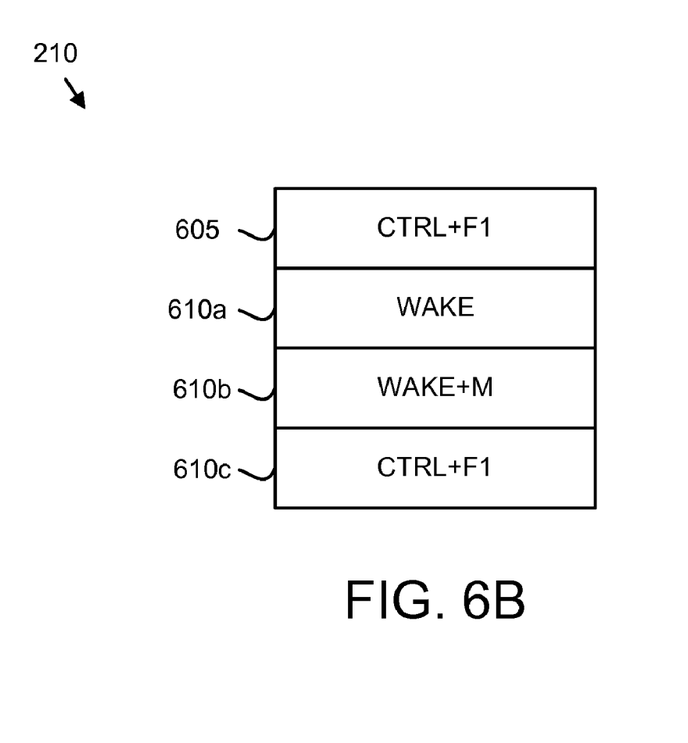

FIG. 6B is a schematic block diagram illustrating one embodiment of a storage module 210 with stored input of the present invention. The storage module 210 of FIG. 6A is depicted with an input value 'CTRL+F1' stored in the input storage data field 605. The input value is received from the input module 605 in response to the user input.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 7 is a schematic flow chart diagram illustrating one embodiment of a waking process selection method 600 in accordance with the present invention. The method 700 substantially includes the steps to carry out the functions presented above with respect to the operation of the described apparatus 200, 220, 500, 210 and systems 100, 300, 400 of FIGS. 1-6B. The description of the method 700 refers to elements of FIGS. 1-6B, like numbers referring to like elements.

The method 700 begins and in one embodiment, the storage module 210 stores 705 a plurality of specified input values in the specified input value data fields 610. In an alternate embodiment, the storage module 210 is fabricated with encoded specified input values in the specified input value data fields 610.

In one embodiment, the storage module 210 is integrated within the input module 205. In a prophetic example, the storage module 210 may be integrated in the keyboard 105 of FIG. 1. In an alternate embodiment, the storage module 210 may be integrated within the data processing device 100.

The input module 205 receives 710 a specified input during the off state of the data processing device 100. In one embodiment, the user may make one or more specified keystrokes. Alternatively, the user may depress one or more buttons on a pointing device such as a mouse. In a prophetic example, the input module 205 receives 710 the input 'CTRL+F1.'

The input module 205 stores 715 the input in the input storage data field 605 of the storage module 210. In one embodiment, the input module 205 stores 715 each input in the input storage data field 605 as the input is received. In a certain embodiment, the input module 205 stores 715 each input with an input value corresponding to an input value of the specified input value data fields 610 of the storage module 210. Thus, the input that wakes the data processing device 100 is stored 715 in the input storage data field 605 of the storage module 210. Continuing the prophetic example above, the input module 205 may store 715 the input 'CTRL+F1' in the input storage data field 605 of the storage module 210 as illustrated in FIG. 6B.

The input module 205 activates 720 the data processing device 100 in response to the input. In one embodiment, the input module 205 compares each input with each specified input value stored in the specified input value data fields 610 of the storage module 210. If an input is substantially equivalent to a specified input value, the input module 205 may activate 720 the data processing device 100. Continuing the prophetic example above, the input module 205 may activate 720 the data processing device 100 as the input 'CTRL+F1' is substantially equivalent to the specified input value 'CTRL+F1' stored in the third specified input value data field 610*c* of the storage module 210. In an alternate embodiment, the input module 205 is hardwired to activate 720 the data processing device 100 when one or more specified inputs are received.

In one embodiment, the input module 205 communicates with the data processing device 100 to wake the data processing device 100. In a prophetic example, the input module 205 writes a specified value through the USB module 350 to a register in the south bridge module 325 of FIG. 3. The south bridge module 325 may activate the data processing device 100 in response to receiving the specified value.

In one embodiment, the wake module 215 executes 725 in response to the data processing device 100 waking. In a certain embodiment, the wake module 215 is configured as the BIOS module 340. The data processing device 100 may execute the BIOS image 410 of the BIOS module 340. In one embodiment, the processor module 305 loads the address of the BIOS image 410 into an instruction pointer, retrieves the software instruction from the BIOS image 410, and executes the software instruction. The BIOS image 410 executing on the processor module 305 may embody the wake module 215.

The wake module 215 may retrieve 730 the input from the input storage data field 605 of the storage module 210. In one embodiment, the wake module 215 reads the input storage data field 605, such as by reading the input storage data field 605 through the USB module 350. In a certain embodiment, the wake module 215 retrieves 730 a plurality of input values and parses the plurality of input values for a specified input value such as those of the input value data fields 510 of the process table 220.

The wake module 215 determines 735 a process that corresponds to the input. In one embodiment, the wake module 215 uses the input as a key to select a process address from a process address data field 515 of the process table 220. Continuing the prophetic example above, the wake module 215 may select the process address 'x0000FF00h' from the third process address data field 515c of the process table 220 as the third input value data field 510c of the process table 220 stores the input value 'CTRL+F1' that substantially equivalent to the input 'CTRL+F1.'

The wake module 215 wakes 740 the computer using the process and the method 700 terminates. In one embodiment, the wake module 215 loads the process address to the instruction pointer of the processor module 305. The processor module 305 may execute the wake process image 405. Continuing the prophetic example above, the wake module 215 may load the process address 'x0000FF00h' to the instruction pointer, and the processor module 305 may execute the third wake process image 405c. Thus continuing the prophetic example, the data processing device 100 may wake with the diagnostic process that is configured to test the data processing device 100. The method 700 supports selecting the wake process 405 from the input.

The embodiment of the present invention determines 735 a waking process in response to an input during a data processing device off state. In addition, the embodiment of the present invention supports waking 740 the data processing device 100 using the selected waking process.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to select a waking process, the apparatus comprising:
   an input module in communication with a data processing device and receiving a specified input during a data processing device off state and activating the data processing device in response to the input;
   a storage module storing the input during the data processing device off state; and
   a wake module retrieving the input from the storage module, determining a process that corresponds to the input by using the input to retrieve a process address from a process table, and waking the data processing device by loading and executing the process, wherein the process is a simplified operating system that decompresses and displays a compressed video stream and that does not support all functions of a primary operating system, to preserve processing bandwidth for displaying the compressed video stream.

2. The apparatus of claim 1, wherein the input module is a keyboard.

3. The apparatus of claim 2, wherein the keyboard comprises a plurality of wake selection keys that each generate a distinct input.

4. The apparatus of claim 2, wherein the specified input received during the data processing device off state is a combination of keystrokes.

5. The apparatus of claim 1, wherein the input module is a touch screen.

6. The apparatus of claim 1, wherein the input module is a pointing device.

7. The apparatus of claim 1, wherein the wake module is a binary input/output system ("BIOS").

8. The apparatus of claim 1, wherein the storage module stores the input in a non-volatile register of a Universal Serial Bus (USB) interface.

9. The apparatus of claim 1, wherein the input module, the storage module, and the wake module each comprise a hardware circuit.

10. A semiconductor device storing a program of software instructions for selecting a wake process, wherein the program when executed on a computer causes the computer to:
    receive a specified input during an off state of the computer;
    store the input in a storage module during the off state of the computer;
    activate the computer in response to the input;
    retrieve the input from the storage module;
    determine a process that corresponds to the input by using the input to retrieve a process address from a process table, wherein the process is a simplified operating system that decompresses and displays a compressed video stream and that does not support all functions of a primary operating system, to preserve processing bandwidth for displaying the compressed video stream; and
    wake the computer by loading and executing the selected process.

11. The semiconductor device of claim 10, wherein the program further causes the computer to store a plurality of specified input values.

12. The semiconductor device of claim 10, wherein the input is stored in a non-volatile register of a USB interface.

13. A system to select a waking process, the system comprising:
    a processor module executing software instructions and processing data;
    a memory module storing the software instructions and the data;
    a keyboard in communication with the processor module and the memory module, receiving a specified input during a data processing device off state, and activating the processor module and the memory module in response to the input;
    a storage module storing the input during the data processing device off state; and a wake module retrieving the input from the storage module, determining a process that corresponds to the input by using the input to retrieve a process address from a process table, and waking the system by loading and executing the process, wherein the process is a simplified operating system that decompresses and displays a compressed video stream and that does not support all functions of a primary operating system, to preserve processing bandwidth for displaying the compressed video stream.

14. The system of claim 13, wherein the keyboard comprises a plurality of wake selection keys that each generate a distinct specified input.

15. The system of claim 14, wherein the specified input received during the data processing device off state is a combination of keystrokes.

16. The system of claim 13, wherein the storage module stores the input in a non-volatile register of a USB interface.

17. A method for deploying a computer infrastructure for selecting a wake process, comprising a storage device storing executable code integrated into a computing system, wherein the code in combination with the computing system is capable of performing the following:

storing a plurality of specified input values;

receiving an input of the plurality of specified input values during an off state of a data processing device;

storing the input in a storage module during the off state of the data processing device;

activating the data processing device in response to the input;

retrieving the input from the storage module;

determining a process that corresponds to the input by using the input to retrieve a process address from a process table, wherein the process is a simplified operating system that decompresses and displays a compressed video stream and that does not support all functions of a primary operating system, to preserve processing bandwidth for displaying the compressed video stream; and waking the data processing device by loading and executing the selected process.

18. The method of claim 17, wherein the input is stored in a non-volatile register of a USB interface.

* * * * *